United States Patent
Chirivella et al.

(10) Patent No.: US 6,765,057 B1
(45) Date of Patent: Jul. 20, 2004

(54) PROCESS FOR THE PREPARATION OF ANIONIC AQUEOUS POLYMER DISPERSIONS CONTAINING NO VOLATILE TERTIARY AMINE, OBTAINED DISPERSION AND COATING RESULTING FROM SAID DISPERSION

(75) Inventors: Josep Oller Chirivella, ES-Sant Quirze des Valles (ES); Mario Jimenez Martinez, ES-Terrassa (ES); Montserrat Pous Brutau, ES-Granollers (ES)

(73) Assignee: Stahl International B.V., Waalwijk (NL)

( * ) Notice: Subject to any disclaimer, the term of this patent is extended or adjusted under 35 U.S.C. 154(b) by 223 days.

(21) Appl. No.: 09/857,006

(22) PCT Filed: Oct. 16, 2000

(86) PCT No.: PCT/NL00/00740

§ 371 (c)(1),
(2), (4) Date: Aug. 28, 2001

(87) PCT Pub. No.: WO01/27178

PCT Pub. Date: Apr. 19, 2001

(30) Foreign Application Priority Data

Oct. 15, 1999 (NL) ............................................. 1013300

(51) Int. Cl.[7] ............................................. C08G 18/62
(52) U.S. Cl. ........................... 524/840; 525/127; 522/96
(58) Field of Search ......................... 524/840; 525/127; 522/96

(56) References Cited

U.S. PATENT DOCUMENTS

| 4,701,480 A | 10/1987 | Markusch et al. |
| 5,679,754 A | 10/1997 | Larson et al. |

FOREIGN PATENT DOCUMENTS

| EP | 0219677 A | 4/1987 |
| EP | 0308115 A | 3/1989 |
| EP | 0 664 488 A | 7/1995 |
| WO | WO 93 24551 A | 12/1993 |
| WO | WO 95 04305 A | 2/1995 |

*Primary Examiner*—Rachel Gorr
(74) *Attorney, Agent, or Firm*—Jeffrey D. Myers; Peacock, Myers & Adams, P.A.

(57) ABSTRACT

The invention relates to a process for the preparation of an aqueous dispersion of an anionic polyurethane in which initially a tertiary aminofunctional acrylic monomer is used as neutralizing agent for pendant carboxylic acid groups in dispersions of a polyurethane or a polyurethane/polyacrylate, whereafter the unsaturated monomers undergo in situ an addition polymerisation, optionally together with other unsaturated monomer. In the process the isocyanate terminated prepolymer may be reacted with 0–100% of a stoichiometric amount of a hydroxy functional unsaturated monomer before the dispersion in water. The tertiary amine functional usaturated monomer is preset in a ratio to the anionic residues to be neutralized in the polyurethane prepolymer from 0.3 to 2 and preferably from 0.7 to 1.5. Furthermore the amount of carboxylic acid functions in the isocyanate functional polyurethane prepolymer is from 1 to 15% and preferably from 2 to 10%. The invention also relates to dispersions prepared by the present process and to a coating or film obtained from said dispersion.

18 Claims, No Drawings

PROCESS FOR THE PREPARATION OF ANIONIC AQUEOUS POLYMER DISPERSIONS CONTAINING NO VOLATILE TERTIARY AMINE, OBTAINED DISPERSION AND COATING RESULTING FROM SAID DISPERSION

The present invention relates to a process to prepare aqueous dispersions of anionic polyurethanes and polyurethane-polyacrylate hybrids containing tertiary amino functional acrylic oligomers, polymers or copolymers as acid-neutralizing agents, in the absence of volatile tertiary amines.

INTRODUCTION

Aqueous dispersions of polyurethanes or polyurethane-polyacrylate hybrids are well known as basis for the production of coating compositions. They may be used for protective or decorative coating, optionally in combination with additives like coloring agents, pigments, matting agents, and the like. Polyurethanes can possess many desirable properties such as good chemical resistance, water resistance, solvent resistance, toughness, abrasion resistance, durality. Thermoplastic polyurethane-polyacrylate hybrid dispersions became of interest regarding to polyurethanes because of their lower raw material costs and they became of interest regarding to polyacrylates because of their better performance.

As is by now well known in the art, aqueous polyurethane dispersions are particularly advantageously prepared by dispersing an isocyanate-terminated polyurethane prepolymer bearing ionic and/or non-ionic dispersing groups into an aqueous medium and than reacting the prepolymer with an active hydrogen containing chain extender while dispersed in the aqueous medium. See e.g. UK-patents 1549458 and 1549459.

Generally polyurethane-polyacrylate hybrids are prepared by an addition polymerisation of acrylic monomers in a polyurethane dispersion. The acrylic monomers can be added to the polyurethane dispersion, which is described in for example DE 1953348, EP643734 but they can also be added during the preparation of the polyurethane dispersion at several stages, which is described in for example U.S. Pat. No. 4,644,030, EP742239. The vinylic monomers can be added during or after the polyurethane prepolymer formation and in these cases they function as viscosity reducing solvents. The advantage is that no or less other organic solvents have to be used, and a better homogeneity is obtained. The addition polymerisation is executed after the formation of the aqueous polyurethane. Moreover, further vinylic monomers may be added during the polymerisation as described in for example EP 308115.

Dispersibility of the polyurethanes or polyurethane-polyacrylate hybrids in water can be achieved by incorporation of appropriate chain pendant ionic groups, chain pendant non-ionic hydrophilic groups, or in-chain non-ionic hydrophilic groups in the structure of the polyurethane polymer. If suitable, external surfactants can be applied in addition. Preferably anionic groups are incorporated into the polyurethane backbone, such as carboxylic, sulfonic, sulfate or phosphate groups, by reaction of an isocyanate reactive compound having at least one acid group with a polyisocyanate. Most common is the incorporation of a carboxylic acid functional compound.

The carboxylic acid functions are generally neutralized before or during dispersion of the polyurethane prepolymer or prepolymer-vinylic monomer solution in water with a volatile tertiary amine. Anorganic bases are less convenient, since the polyurethane will coagulate when they are applied or it will provide highly water sensitive films or coatings. To prevent coagulation it is suitable to incorporate a great number of hydrophilic polyethoxy chains into the polymer system.

A disadvantage of the application of volatile tertiary amines as neutralizing agent is that they evaporate during the film formation, and therefore will cause environmental pollution, The present invention offers a process to prepare aqueous dispersions of anionic polyurethanes or of polyurethane-polyacrylate hybrids containing no volatile tertiairy amines.

DESCRIPTION OF THE INVENTION

The object of the present invention is to provide a process to prepare a dispersion of a polyurethane or a polyurethane-polyacrylate hybride which contains no volatile tertiary amines as neutralizing agents for carboxylic acid groups.

Accordingly the present invention relates to a process for the preparation of an aqueous dispersion of an anionic polyurethane in which initially a tertiary amino-functional acrylic monomer of formula I

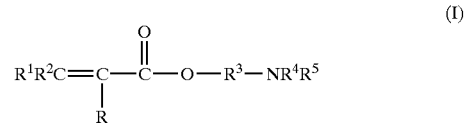

(I)

wherein,

R, $R^1$, $R^2$, $R^3$, $R^4$ and $R^5$ are organic groups which have no reactivity towards the double bond or the tertiary amine function, is used as neutralizing agent for pendant carboxylic acid groups in dispersions of a polyurethane or a polyurethane/polyacrylate, whereafter the unsaturated monomers undergo in situ an addition polymerisation, optionally together with other unsaturated monomers, characterized in that the aqueous dispersion of the anionic polyurethane is prepared by the steps of preparation of an isocyanate functional anionic polyurethane prepolymer, optionally in the presence of vinylic monomers mixing of the isocyanate terminated anionic polyurethane prepolymer with a tertiary-amino functional unsaturated monomer and optionally other vinylic monomers followed by dispersion of the obtained mixture into water, and chain extension of the polyurethane prepolymer with an active hydrogen compound during or after the dispersion in water, initiating radical polymerisation of the vinylic monomers, including the tertiary amino functional unsaturated monomers.

Advantage of this process is that after the polymerisation of the unsaturated monomers containing a tertiary amine the dispersions contain no volatile amines and therefore environmental problems will be eliminated. Another advantage of the process is that the unsaturated monomers containing a tertiairy amine function act as viscosity reducing solvents during the formation of the aqueous polyurethane. This effect is improved when other unsaturated monomers are present as well and an aqueous dispersion of a polyurethane-polyacrylate hybride is formed. In both situations less or sometimes even no other organic solvents have to be used, and a better homogeneity is obtained.

A further part of the invention is a process in which the isocyanate terminated prepolymer is reacted with 0–100% of a stoichiometric amount of a hydroxy functional unsaturated monomer before the dispersion in water.

As a result the polyurethane prepolymer is completely or partially functionalized with acrylic double bonds by complete or partial reaction of the isocyanate functions of the prepolymer with a hydroxy functional unsaturated monomer. As a result the polyurethane polymer system will contain double bonds and will contribute to the addition polymerisation.

The acid groups in the prepolymer are initially neutralized by a tertiary amine functional unsaturated monomer. In the process of the invention a tertiary amine functional acrylic polymer is formed during the process by radical polymerisation of the tertiary-amino functional unsaturated monomers. When other unsaturated monomers are present a copolymer will be formed during the process including the tertiary amine functional unsaturated monomers and the other unsaturated monomers. The other vinylic monomers which may be present are selected from acrylic alkyl esters, methacrylic alkyl esters, styrene esters or ethers of vinyl alcohol. The other vinylic monomers are present in an amount of 0 to 90%.

The present invention further comprises the dispersions prepared by the process and coatings or films derived from dispersions prepared by the process.

At low levels of other vinylic monomers or, without the presence of vinylic monomers, the performance of the films or coatings of the dispersions will be comparable with the performance of the films or coatings of polyurethane dispersions. At higher levels of other vinylic monomers the performance of the films or coatings of the dispersions will be comparable with the performance of the films or coatings of polyurethane-polyacrylate hybride dispersions.

Both the polyurethane and the acrylic monomers may contain additional functional groups with the objective to improve the waterdispersibility, to improve adhesion to substrates at application, for performance reasons, or as potential sites for crosslinking. Suitable functions are polyalkoxy functions with a large concentration of ethoxy functions, are tertiairy amine or quaternairy amine functions, perfluor functions, incorporated silicon functions, hydrazide functions or hydrazone functions, ketone, acetoacetate, hydroxy, methylol, amide, glycidyl, ureido or aldehyde functions.

DETAILED DESCRIPTION OF THE INVENTION

The tertiary amine functional unsaturated monomer which is used in the process of the invention can be a dialkylaminoalkyl acrylate, a dialkylaminoalkyl methacrylate, a dialkyl aminoalkoxy acrylate and/or a dialkylaminoalkoxy methacrylate. Suitable examples are dimethylaminoethyl acrylate, dimethyl-aminoethyl methacrylate, diethylaminoethyl acrylate, diethylaminoethyl methacrylate, 2-(diethylamino)ethanol vinylether and the like.

The tertiary amine functional unsaturated monomers are present in a ratio to the anionic residues to be neutralized in the polyurethane prepolymer from 0.3 to 2 and preferably from 0.7 to 1.5

When the isocyanate functional polyurethane prepolymer is reacted with a hydroxy functional unsaturated monomer the reaction is carried out by techniques well known in the art at 40 to 130° C. The hydroxy functional unsaturated monomer may be hydroxyethyl methacrylate, hydroxypropyl acrylate, hydroxypropyl methacrylate, hydroxybutyl acrylate, hydroxy butyl methacrylate, hydroxypolyester acrylates or methacrylates.

The polyurethane and/or polyurethane-polyacrylate hybride contains anionic groups to obtain water dispersibility. This anionic group can be a carboxyl, a sulfonic, a sulfate and/or a phosphate group and is preferably a carboxyl group.

The isocyanate functional polyurethane prepolymer containing carboxylic acid groups is prepared in a conventional way. EP 308115 presents an overview of the process and of suitable polyols and polyisocyanates as starting materials for such polyurethane prepolymers. Ketone functional polyester polyols are included as well. Suitable hydrogen reactive chain extenders and the conditions wherein they are used are described in the same application.

The amount of carboxylic acid functions in the isocyanate functional polyurethane prepolymer is from 1 to 15% and preferably from 2 to 10%. The carboxylic acid functions are introduced in the prepolymer by incorporation of a dihydroxy alkanoic acid, which may be a 2,2-dimethylol alkanoic acid and is preferably 2,2-dimethylol propanoic acid.

In order to obtain polyurethane-polyacrylate hybrids, other vinylic monomers may be added. They can be added completely or partially to the polyurethane prepolymer or, preferably the polyurethane prepolymer is formed in the presence of the vinylic monomers. By combining the polyurethane prepolymer with the vinylic monomers an optimal homogenity is obtained and the viscosity will be reduced. As a consequence less additional solvents will be needed. The vinylic monomers can be further added completely or partially after dispersion of the polyurethane prepolymer in water, during or after the chain extension. They further can be partially added during the radical polymerisation process.

Suitable vinylic monomers which can be used in addition are selected from acrylic or methacrylic alkyl esters, acrylic or methacrylic alkyl esters, optionally functionalized with hydroxy, quaternary amines or halogen groups, acrylonitrile, styrene, esters and ethers of vinyl alcohol.

The final proportion of additional vinylic monomers may vary from 0 up to 90%, and preferably from 0 to 60%.

The tertiary amine functional unsaturated monomer may be mixed with the polyurethane prepolymer, optionally in the presence of other vinylic monomers and be dispersed in water using techniques well known in the art. Preferably, water is stirred into the mixture with agitation or, alternatively, the mixture is added to the water and optionally the chain extender with agitation. Alternatively the polyurethane prepolymer, optionally in the presence of other vinylic monomers is added to a mixture of water and the tertiary amine functional unsaturated monomer and optionally the chain extender with agitation.

Regularly the ratio of tertiairy amine functions to the acid groups in the polyurethane prepolymer is from 0.3 to 2 and preferably from 0.7 to 1.5. At lower levels of the tertiary amine functional acrylate, the final dispersion will have a lower pH value, which may be advantageous for some crosslinking applications.

Polymerisation of the tertiary amine functional unsaturated compound or combination of the tertiary amine functional unsaturated compound and other vinylic monomers may be effected by the methods described in EP308115.

The polyurethane and/or the acrylic monomers of the invention may contain additional functional groups which may be polyalkoxy functions with a large concentration of ethoxy functions, may be tertiary amine or quaternary amine functions, perfluor functions, incorporated silicon functions, hydrazide functions or hydrazone functions, ketone, acetoacetate, hydroxy, methylol, amide, glycidyl, ureido or aldehyde functions.

Conventional non-ionic, anionic or cationic surfactants may be applied to optimize dispersion of the polymer system in water and stabilisation of the final polymer dispersion. Suitable examples may be based on long-chain dialkyl sodium sulphosuccinate, arylalkylpoly-ethoxyalkyl derivatives, highly ethoxylated polyurethane derivatives and the like.

The aqueous polymer dispersions produced by the method of the invention are stable for long periods of time. If desired minor amounts of solvents may be included in the dispersions.

Many additional ingredients may also be present in the application stage, for example fillers, colorants, pigments, silicons, flow agents, foam agents, fire retardants and the like.

The aqueous polymer dispersions produced by the method of the invention may be used in adhesives, sealants, printing ink and in coatings. They may be applied on any substrates, including leather or artificial leather, metals, wood, glass, plastics, paper, paper board, textile, non-woven, cloth, foam and the like by conventional methods, including spraying, flow-coating, roller-coating, brushing, dipping, spreading and the like.

Various aspects of the present invention are illustrated by the following examples. These examples are only illustrative and are not limiting the invention as claimed hereafter.

EXAMPLES

Example 1

Preparation of an aqueous polyurethane dispersion containing a copolymerized tertiary amine functional methacrylate.

26.33 g (118.5 mmole) of 3-isocyanatomethyl-3,5,5-trimethylcyclohexylisocyanate (hereafter referred to as IPDI) was added to a mixture of 53.2 g (26.6 mmole) of a polycarbonate diol with a molecular weight of about 2000 (obtainable from Stahl USA as PC-1122) and 5.28 g (37.45 mmole) of 2,2-dimethylol-propanoic acid in 12 g of N-methylpyrrolidone at 60° C. while mixing. The mixture was heated to 90° C. and the mixture was reacted at 90° C. for 2 hrs. After 1 hr of reaction 0.01 g of tinoctoate was added as a catalyst. The reation mixture was cooled down. The amount of NCO in the obtained prepolymer was 4.32%.

2.43 g (15.46 mmole) of dimethylaminoethyl methacrylate (hereafter referred to as DMAEMA) was mixed with 39.27 gram of the the prepolymer at 55° C. for 20 min. The neutralized prepolymer was dispersed into 57.28 g of demineralized water and the polyurethane prepolymer was chain extended by the addition of 0.96 g (19.2 mmole) of hydrazine hydrate. The mixture was stirred for 30 min. The absence of residual NCO was checked by IR-spectroscopy.

12 g of butyl acrylate and 22.3 g of water were mixed in the polyurethane and the tertiary amine functional methacrylic monomer was polymerized together with the butyl acrylate within one hour at 75–80° C., using 0.03 g of t-butylhydroperoxide and 1.01 g of a 1% solution in water of isoascorbic acid as redox initiation system. The obtained product had a solids amount of 34% and a pH of 6.9.

Example 2

Preparation of an aqueous polyurethane dispersion containing a copolymerized tertiary amine functional methacrylate.

The process for the preparation of the polyurethane dispersion of example 1 was repeated up to and including the extension with hydrazine. 2.43 g of butyl acrylate, 2 g of dioctyl sodium sulphosuccinate and 10 g of water were added to the polyurethane dispersion and the tertiary amine functional methacrylic monomer was polymerized together with the butyl acrylate within one hour at 75–80° C., using 0.03 g of t-butylhydroperoxide and 1.01 g of a 1% solution in water of isoascorbic acid as redox initiation system. The obtained product was adjusted with water to a solids amount of 35% and it had a pH of 6.9.

Example 3

Preparation of an aqueous polyurethane dispersion containing a copolymerized tertiary amine functional methacrylate.

The process of example 2 was repeated with the exception that the polyurethane prepolymer was prepared from 22.89 g (103 mmole) of IPDI, 60.00 g (30 mmole) of polycarbonate diol and 3.6 g (25.53 mmole) of 2,2-dimethylolpropanoic acid in 10 g of N-methylpyrrolidone and the NCO-amount of the obtained prepolymer was 3.58%. Further, 1.66 g (10.56 mmole) of DMAEMA was mixed with 38.4 g of the prepolymer and 59.08 g of water was used for the dispersion. The obtained polyurethane dispersion was mixed with 1.63 g of butyl methacrylate and 2 g of dioctyl sodium sulphosuccinate, whereafter the tertiary amine functional methacrylic monomer was polymerized together with the butyl methacrylate within one hour at 75–80° C., using 0.03 g of t-butylhydroperoxide and 1.01 g of a 1% solution in water of isoascorbic acid as redox initiation system. The obtained product was adjusted with water to a solids amount of 35% and it had a pH of 7.

Example 4

Preparation of an aqueous polyurethane dispersion containing a copolymerized tertiary amine functional methacrylate.

The process of example 2 was repeated with the exception that the DMAEMA was replaced by 2.86 g of diethylaminoethyl methacrylate.

Example 5

Preparation of a hydrazon functional chain extender 100 g (1 mole) of ethylacrylate was added within 45 min to 170 g (1 mole) of isophoron diamine at 40–45 C. The mixture was stirred for 4 hrs at 40–45° C. The reaction was checked by the disappearance of the double bond signals at 960 and 1600 cm$^{-1}$ in the infrared spectrum. The intermediate product was a ethyl N-aminopropionate functional isophorone diamine. 50 g of hydrazine hydrate (1 mole) was added to the product at 55° C. and the product was heated and stirred at 55–60° C. during 5 hrs. The reaction was checked by the disappearance of the carbonyl signal at 1740 cm$^{-1}$ from the ester carbonyl and de appearance of the carbonyl signal from the hydrazide carbonyl at 1650 cm$^{-1}$ in the infrared spectrum. The second intermediate product was a N-hydrazidopropionate functional isophorone diamine. 58 g (1 mole) of aceton was added to the obtained product at ambient temperature and the mixture was stirred for 15 min. The product was a isophorone diamine substituted at one N by an 3-propionyl hydrazone. The product contained 2.65 meq/g of hydrazone functions and 5.29 meq/g of amine functions.

Example 6

Preparation of an hydrazone functional aqueous polyurethane dispersion containing a copolymerized tertiary amine functional methacrylate.

The process of example 5 was repeated with the exception that the hydrazine was replaced by a mixture of 7.26 g of the product of example 5 and 7.26 g of water. The obtained product had a solids amount of 35.4%, a hydrazone functionality of 0.145 meq/g and a pH of 7.9.

Example 7

Preparation of an aqueous polyurethane dispersion containing a copolymerized tertiary amine functional methacrylate.

33.27 g (149.7 mmole) of IPDI was added to a mixture of 45.4 g (22.7 mmole) of a polytetramethylene glycol with a molecular weight of about 2000 (obtainable as Terathane 2000 from Du Pont de Nemours) and 6 g (27.0 mmole) of 2,2-dimethylol-propanoic acid in 12 g of N-methylpyrrolidone at 60° C. while mixing. The mixture was heated to 90° and the mixture was reacted at 90° C. for 2 hrs. After 1 hr of reaction time 0.01 g of tinoctoate was added as a catalyst. The reaction mixture was cooled down. The amount of NCO in the obtained prepolymer was 7.00%.

1.67 Gram (11.7 mmole) of dimethylaminoethyl acrylate and 8 g of butylacrylate were mixed with 26.10 gram of the prepolymer at 55° C. for 20 min. The neutralized prepolymer was dispersed into 71.30 g of demineralized water and the polyurethane prepolymer was chain extended by the addition of 1.03 g (20.6 mmole) of hydrazine hydrate. The mixture was stirred for 30 min. The absence of residual NCO was checked by IR-spectroscopy.

8.34 g of butyl acylate was added to 69.52 g of the polyurethane dispersion and the tertiary amine functional methacrylic monomer and the butyl acrylate monomer were polymerised within one hour at 75–80° C., using t-butyl-hydroperoxide and isoascorbic acid as redox initiation system. The obtained product had a solids amount of 34.0% and a pH of 7.0.

Example 8

Preparation of an aqueous polyurethane dispersion containing a copolymerized tertiary amine functional methacrylate.

The process of example 7 was repeated with the exception that the butylacrylate which was mixed with the polyurethane prepolymer and the dimethylaminoethyl acrylate was replaced by ethylhexylacrylate.

The product was adjusted to a solids amount of 35% with water and the pH was 7.2.

Example 9

Preparation of an aqueous polyurethane dispersion containing a copolymer of a tertiary amine functional methacrylate, butylacrylate and a acetoacetyl functional methacrylate. The process of example 2 was repeated with the exception that before the initiation of the addition polymerisation the butylacrylate was replaced by 1 g of acetoacetoxyethyl methacrylate, 10 g of butylacrylate and 18 g of water was added to the dispersion and the DMABMA was polymerised together with the acetoacetoxyethyl methacrylate and the butyl acrylate The obtained product had a solids amount of 35.2%, a pH of 7.1 and a acetoacetate functionality of 0.215 meq/g

Example 10

Preparation of an aqueous dispersion of a polyurethane containing pendant ketone functions and containing a copolymer of a tertiary amine functional methacrylate and butylacrylate.

Under a nitrogen atmosphere 182.33 g (0.13 mole) of a polyester diol with a OH number of 80 and containing ketone functions (available from NeoResins as PEC-205), 12.06 g (0.09 mole) of dimethylol-propanoic acid and 94.4 g of N-methylpyrolidone were heated to 70° C. while stirring. 88.8 g (0.4 mole) of IPDI was added and the mixture was heated to 100° C. and stirred for 2 hrs to form a polyurethane prepolymer. After 1 hr of reaction time 0.04 g of tinoctoate was added as catalyst. The reaction was cooled down and the amount of remaining NCO appeared to be 2.87%.

110 g of the polyurethane prepolymer was mixed with 4.28 g of DMAEMA and 4 g of dioctyl sodium sulphosuccinate and the mixture was dispersed into 120 g of water. 1.79 g of hydrazine hydrate in 4.2 g of water was added within 5 min and the dispersion was stirred for 30 min. The NCO-signal in the IR-spectrum at 2240 $cm^{-1}$ was disappeared.

4.28 g of butyl acrylate was added and polymerisation of the DMAEMA together with the butyl acrylate was effected within one hour at 75–80° C. The obtained product was adjusted with water to a solids amount of 35.0% and had a pH of 7.0.

Example 11

Preparation of an aqueous polyurethane dispersion which is copolymerized with a tertiary amine functional methacrylate and with butyl methacrylate.

24.14 g (108.6 mmole) of IPDI was added to a mixture of 53.2 g (26.6 mmole) of the polycarbonate diol of example 1, 1.5 g (3.57 mmole) of a polypropylene glycol diol with a molecular weight of 420 and 3.52 g (25 mmole) of 2,2-dimethylol-propanoic acid in 12 g of N-methylpyrrolidone at 60° C. while mixing. The mixture was heated to 90° and the mixture was reacted at 90° C. for 2 hrs. After 1 hr of reaction time 0.01 g of tinoctoate was added as a catalyst.

The reaction mixture was cooled down. The amount of NCO in the obtained prepolymer was 4.40%.

0.006 Gram of inhibitor MEHQ (methylether of hydroquinone) was added to 94.07 gram of the prepolymer at 75° C. After stirring for ten minutes, 5.92 g (51 mmole) of 2-hydroxyethylacrylate was added. The reaction mixture was stirred for 3 hours at 75–80° C. and then cooled down to 55° C. The resulting intermediate prepolymer was partially capped with the hydroxy ethylacrylate and had a NCO-amount of 1.79%.

The prepolymer was neutralised by mixing 1.49 gram of DMAEMA with 37.05 gram of the intermediate prepolymer at 55° C. for 20 min. 1.88 gram of dioctyl sodium-sulfosuccinate was mixed with 1.88 gram of N-methyl-pyrrolidone and added to the prepolymer mix. The neutralized prepolymer mix was dispersed in demineralised water for 45 minutes and the polyurethane prepolymer was chain extended with hydrazine. The absence of residual NCO was checked by IR-spectroscopy.

2 gram of dioctyl sodium sulphosuccinate and 1.35 gram of butyl methacrylate were added to 88.3 gram of the polyurethane dispersion. The tertiary amine functional acrylic monomer together with the double bonds of the polyurethane and of the butyl methacrylate was polymerised at 75° C. using 0.05 gram of t-butylhydroperoxide and 1.5 gram of a 1% iso-ascorbic acid solution in water. A post-treatment of 1 hour was made with the same portions of initiators.

The obtained dispersion had a solids amount of 36.4% and a pH of 7.2

Comparative Examples 12–15

Preparation of polyurethane dispersions in which triethylamine is the neutralization agent for carboxylic acid groups.

The process of example 2, 3, 6, and 7 were repeated with the exception that the DMAEMA was replaced by a stoichiometric amount of triethylamine, and the products were adjusted to a solids amount of 35%. Triethylamine is a conventional neutralizing agent for the carboxylic acid functions in the polyurethane. The comparative examples 12, 13, 14, and 15 correspond with respectively the examples 2, 3, 6, and 7.

Example 16

This example is concerned with the evaluation of the films of the products of example 2, 3, 6, 7, 12, 13, 14, and 15.

Films of 200 and 600 μm were prepared of the products of example 2, 3, 6, 7 and of the corresponding comparative examples 12, 13, 14, and 15. Further films were prepared of the products of example 6 and 14 together with XR-5350, is a NCO-crosslinker obtainable from Stahl Holland. The mechanical properties of the films were determined. Further the weight increase of the films in water was measured after treatment of the films with water for 24 hours. The results are presented in table 1. The results show that the film properties of the polyurethanes from which the carboxylic acid functions were neutralized with DMAEMA, whereafter the DMAEMA was polymerised by addition polymerisation, were comparable with those from which the carboxylic acid functions were neutralized by triethylamine. They had comparable mechanical properties and the sensitivity towards water was just slightly less, but had no consequences in application onto leather. During the drying process the polymerized DMAEMA stayed in the film, while the triethylamine was evaporated.

TABLE 1

| Film of example | Mechanical properties (MPa)[a] | | | | weight increase of the films in water (%) |
|---|---|---|---|---|---|
| | M-100 | M-200 | M-300 | Elongation | |
| 3 | 4.5 | 6.4 | 11.0 | 370 | 14 |
| 4 | 3.5 | 5.1 | 7.5 | 420 | 12 |
| 6 | 5.3 | 7.8 | 13.2 | 340 | 13 |
| 6 + XR-5350 | 15.4 | 22.6 | — | 250 | 4 |
| 7 | 3.9 | 6.0 | 9.6 | 360 | 15 |
| 12 | 4.4 | 6.3 | 10.7 | 360 | 17 |
| 13 | 3.6 | 5.2 | 7.6 | 460 | 15 |
| 14 | 5.5 | 7.9 | 13.6 | 320 | 15 |
| 14 + XR-5350 | 15.7 | 23.0 | — | 240 | 6 |
| 15 | 4.0 | 6.2 | 9.9 | 350 | 19 | note to table 1:
a) MPa is megapascal ($10^6$ $Nm^{-2}$). The mechanical properties and the elongation are measured with films which were stretched at a thickness of 200 μm on a MTS Synergie 200 apparatus. The values at M-100, M-200, M-300 give tensile strenghts of the films while stretching them for respectively 50, 100, 150, 200, 300%. The elongation is the maxisal elongation before the film breaks.

What is claimed is:

1. A process for the preparation of an aqueous dispersion of an anionic polyurethane in which initially a tertiary aminofunctional acrylic monomer of formula I:

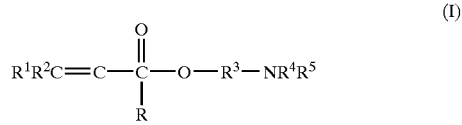

(I)

wherein R, $R^1$, $R^2$, $R^3$, $R^4$ and $R^5$ are organic groups which have no reactivity towards the double bond or the tertiary amine function or wherein R, $R^1$ and/or $R^2$ are H;
is used as neutralizing agent for pendant carboxylic acid groups in dispersions of a polyurethane or a polyurethane-polyacrylate, whereafter the unsaturated monomers undergo in situ an addition polymerization; and
wherein the aqueous dispersion of the anionic polyurethane is prepared by the steps of preparing an isocyanate functional anionic polyurethane prepolymer, containing carboxylic acid functions.

2. A process according to claim 1, in which the isocyanate terminated prepolymer is reacted with 0–100% of a stoichiometric amount of a hydroxy functional unsaturated monomer before the dispersion of water.

3. A process according to claim 1, in which a tertiary amine functional acrylic oligomer or polymer is formed during the process by radical polymerization of tertiary amine functional unsaturated monomers.

4. A process according to claim 1, in which the tertiary amine functional unsaturated monomers react together with other vinylic monomers during the radical polymerization to obtain a tertiary amine functional co-polymer.

5. A process according to claim 1, wherein the tertiary amine functional unsaturated monomer is a dimethylaminoalkyl acrylate, a dialkylaminoalkyl methacrylate, a dialkylaminoalkoxy acrylate and/or a dialkyl-aminoalkoxy methacrylate.

6. A process according to claim 1, wherein the tertiary amine functional unsaturated monomer is dimethylaminoethyl acrylate, diethylaminoethyl methacrylate, diethylaminoethyl acrylate, diethylaminoethyl methacrylate.

7. A process according to claim 1, wherein the tertiary amine functional unsaturated monomer is present in a ratio to the anionic residues to be neutralized in the polyurethane prepolymer from between approximately 0.3 to 2.

8. A process according to claim 1, wherein the amount of carboxylic acid functions in the isocyanate functional polyurethane prepolymer is from approximately 1 weight % to 15 weight %.

9. A process according to claim 2 wherein the hydroxy functional unsaturated monomer is a hydroxy functional acrylate or methacrylate selected from the group consisting of hydroxyethyl acrylate, hydroxyethyl methacrylate, hydroxy-propyl acrylate, hydroxypropyl methacrylate, hydroxybutyl acrylate, hydroxybutyl methacrylate, and hydroxy-polyester acrylate or methacrylate.

10. A process according to claim 4, wherein the other vinylic monomers are selected from acrylic or methacrylic alkyl esters.

11. A process according to claim 10, wherein the other vinylic monomers are present in an amount of approximately 0 weight % to 90 weight %.

12. A process according to claim 1, wherein the polyurethane and/or the acrylic monomers contain additional functional groups selected from the group consisting of polyalkoxy functions with a large concentration of ethoxy functions, tertiary amine or quaternary amine functions, perfluor functions, incorporated silicon functions, hydrazide functions or hydrazone functions, ketone, acetoacetate, hydroxy, methylol, amide, glycidyl, and ureido or aldehyde functions.

13. A process according to claim 1, wherein a conventional non-ionic, anionic or cationic surfactant is applied during the dispersion of the prepolymer solution in water.

14. A dispersion prepared by the process of claim 1.

15. A coating or film obtained from a dispersion prepared by the process of claim 1.

16. A process according to claim 1 wherein R groups are hydrogen.

17. A process according to claim 1 wherein the step of preparing an isocyanate functional anionic polyurethane prepolymer comprises, in the presence of vinylic monomers, mixing the isocyanate terminated anionic polyurethane prepolymer with one or more tertiary-amino functional unsaturated monomer and then dispersing the obtained mixture into water, and chain extending the polyurethane prepolymer with an active hydrogen compound during or after the dispersion in water, thereby initiating radical polymerization of the vinylic monomers including the tertiary amino functional unsaturated monomers.

18. A process according to claim 17 wherein the preparing step is performed in the presence of vinylic monomers other than the tertiary-amino functional unsaturated monomers.

* * * * *